United States Patent
Eros

(10) Patent No.: US 7,207,628 B2
(45) Date of Patent: Apr. 24, 2007

(54) INFANT CAR SEAT WITH ADJUSTABLE BASE PLATFORM

(75) Inventor: Peter F. Eros, Vandalia, OH (US)

(73) Assignee: Evenflo Company, Inc., Vandalia, OH (US)

(*) Notice: Subject to any disclaimer, the term of this patent is extended or adjusted under 35 U.S.C. 154(b) by 124 days.

(21) Appl. No.: 11/007,636

(22) Filed: Dec. 8, 2004

(65) Prior Publication Data
US 2006/0138825 A1 Jun. 29, 2006

(51) Int. Cl.
*A47C 1/08* (2006.01)

(52) U.S. Cl. ............ 297/297; 297/256.13; 297/256.16

(58) Field of Classification Search ............ 297/250.1, 297/256.13, 256.16
See application file for complete search history.

(56) References Cited

U.S. PATENT DOCUMENTS

| | | | |
|---|---|---|---|
| 4,047,755 A | 9/1977 | McDonald et al. | |
| 4,634,177 A | 1/1987 | Meeker | |
| D294,777 S | 3/1988 | Wise et al. | |
| 4,729,600 A | 3/1988 | Single, II et al. | |
| 4,733,909 A | 3/1988 | Single, II et al. | |
| 4,762,364 A | 8/1988 | Young | |
| 4,913,460 A * | 4/1990 | Klein ................. | 280/646 |
| 4,915,446 A | 4/1990 | Darling et al. | |
| 4,943,113 A | 7/1990 | Meeker | |
| 4,976,494 A | 12/1990 | Polley | |
| 5,052,750 A | 10/1991 | Takahashi et al. | |
| 5,058,283 A | 10/1991 | Wise et al. | |
| 5,106,154 A * | 4/1992 | Kain .................. | 297/256.14 |
| 5,181,761 A | 1/1993 | Meeker | |
| 5,277,472 A | 1/1994 | Freese et al. | |
| 5,380,062 A | 1/1995 | Nania | |
| 5,385,387 A | 1/1995 | Kain | |
| 5,551,751 A | 9/1996 | Sedlack et al. | |
| 5,567,008 A | 10/1996 | Cone, II | |
| 5,581,234 A | 12/1996 | Emery et al. | |
| 5,584,731 A | 12/1996 | Dombrowski | |
| 5,625,956 A | 5/1997 | Cone, II et al. | |
| 5,707,110 A | 1/1998 | Campbell et al. | |
| 5,772,279 A | 6/1998 | Johnson, Jr. | |
| 5,836,650 A | 11/1998 | Warner, Jr. et al. | |
| 5,957,531 A * | 9/1999 | Kane et al. ............ | 297/256.14 |
| 5,971,476 A | 10/1999 | Gibson et al. | |
| 6,000,753 A | 12/1999 | Cone, II | |
| 6,017,088 A | 1/2000 | Stephens et al. | |
| 6,042,182 A | 3/2000 | Geis et al. | |
| 6,068,335 A | 5/2000 | Glover | |
| 6,070,890 A | 6/2000 | Haut et al. | |
| 6,139,101 A | 10/2000 | Berringer et al. | |
| 6,170,911 B1 | 1/2001 | Kassai et al. | |
| 6,205,600 B1 | 3/2001 | Sedlack | |
| 6,244,207 B1 * | 6/2001 | Chen .................. | 116/28.1 X |
| 6,299,249 B1 | 10/2001 | Mori | |
| 6,318,799 B1 | 11/2001 | Greger et al. | |
| 6,331,032 B1 | 12/2001 | Haut et al. | |

(Continued)

*Primary Examiner*—Anthony D. Barfield
(74) *Attorney, Agent, or Firm*—Taft, Stettinius & Hollister LLP

(57) ABSTRACT

An infant car seat with an adjustable base platform provides a variable angle of tilt for the seat. The base platform has a visual indicator showing the degree of tilt that has been selected. This visual indicator can include a clear plastic window in the base platform, through which a number or other symbol indicating the degree of tilt can be seen. The user can adjust the degree of tilt by depressing a button to disengage a locking mechanism, allowing the user to vary the degree of tilt until the desired degree of tilt is indicated on the visual indicator.

4 Claims, 5 Drawing Sheets

U.S. PATENT DOCUMENTS

| | | |
|---|---|---|
| 6,343,890 B1 | 2/2002 | Benson |
| 6,428,099 B1 | 8/2002 | Kain |
| 6,428,100 B1 | 8/2002 | Kain et al. |
| 6,454,350 B1 | 9/2002 | Celestina-Krevh et al. |
| 6,471,298 B2 | 10/2002 | Carine et al. |
| 6,474,735 B1 | 11/2002 | Carnahan et al. |
| 6,543,847 B2 | 4/2003 | Balensiefer |
| 6,561,577 B2 | 5/2003 | Kelly |
| 6,588,849 B2 | 7/2003 | Glover et al. |
| 6,626,493 B2 | 9/2003 | Kain |
| 6,676,212 B1 | 1/2004 | Amirault |
| 6,688,685 B2 | 2/2004 | Kain |
| 2003/0020308 A1 | 1/2003 | Pacella et al. |

* cited by examiner

INFANT CAR SEAT WITH ADJUSTABLE BASE PLATFORM

BACKGROUND OF THE INVENTION

This invention relates to an infant car seat, and in particular to an adjustable base platform for an infant car seat.

The prior art includes infant seats, including car seats, having adjustable bases. Although some of the adjustable bases seen in the prior art feature a position indicator, most of these inform the user when the seat or base is in a level position. By employing a gravity ball, pendulum, lever with counterweight, or similar structure, these prior art bases can detect a level orientation and display an indication of such orientation to the user. This display indicator can be accomplished by providing some indicator surface, such as a ball or surface containing a colored region or other markings, that becomes visible through a transparent aperture when the level condition is achieved.

There is a need for an adjustable base having a convenient positional indicator that indicates varying degrees of tilt. Unlike the prior art adjustable base indicators, which only indicate the level condition, the adjustable base of the present invention can indicate which one of a plurality of position settings has been selected. This allows the user to select tilt positions other than a level position for the car seat.

SUMMARY

The present invention is directed to an infant car seat, and in particular to adjustable base platform for an infant car seat. In an embodiment of the present invention, the car seat comprises a seat member and a base unit that is capable of being removably coupled to the seat member. Alternatively, the seat member and base member can be integrally formed as one unit.

It is a first aspect of the present invention to provide an adjustable base platform for an infant car seat, having a frame member; a wedge member affixed to the frame member along an axis parallel to one edge of the frame and wedge members, the wedge member being capable of rotating about the axis; a locking member capable of being positioned to prevent rotation of the wedge member about the axis; and an indicator for displaying a visual indication of the wedge's rotational position. In a detailed embodiment, the indicator comprises a curved lateral surface formed on the wedge member, and visible markings on the curved lateral surface. In a more detailed embodiment, the indicator further comprises a transparent window affixed to the frame member, the transparent window capable of revealing a portion of the visible markings on the curved lateral surface. The visible markings can comprise numerals, and a unique numeral can be visible through the transparent window corresponding to the rotational position of the wedge member or the angle of tilt in which the adjustable base platform or infant car seat is configured.

In an alternative detailed embodiment of the first aspect of the present invention, the wedge member includes a plurality of pairs of notches for engaging the locking member; and the locking member includes a wide portion and a narrow portion, the wide portion capable of engaging any one of the plurality of pairs of notches on the wedge member to prevent rotation of the wedge member about the axis. The locking member can include a surface capable of being depressed by a user, and at least one spring located between the frame member and the locking member, the spring being capable of restoring the locking member to its original position after being depressed by the user. In a more detailed embodiment, the locking member is originally positioned such that its wide portion is engaged with one of the plurality of pairs of notches on the wedge member to prevent rotation of the wedge member about the axis; and, upon depression of the locking member by the user, the locking member becomes positioned such that its wide portion is not engaged with any one of the plurality of pairs of notches on the wedge member, whereby the wedge member can rotate about the axis. These embodiments can be practiced with the same detailed embodiments as set forth in the preceding paragraph.

It is a second aspect of the present invention to provide an infant car seat having a seat member; and a base member capable of being removably coupled to the seat member, where the base member includes a frame member; a wedge member affixed to the frame member along an axis parallel to one edge of the frame and wedge members, the wedge member being capable of rotating about the axis; a locking member capable of being positioned to prevent rotation of the wedge member about the axis; and an indicator for displaying a visual indication of the wedge's rotational position. This second aspect of the present invention can be practiced with the same embodiments as set forth in the preceding paragraphs with respect to the first aspect of the present invention.

DETAILED DESCRIPTION

Figure 1:
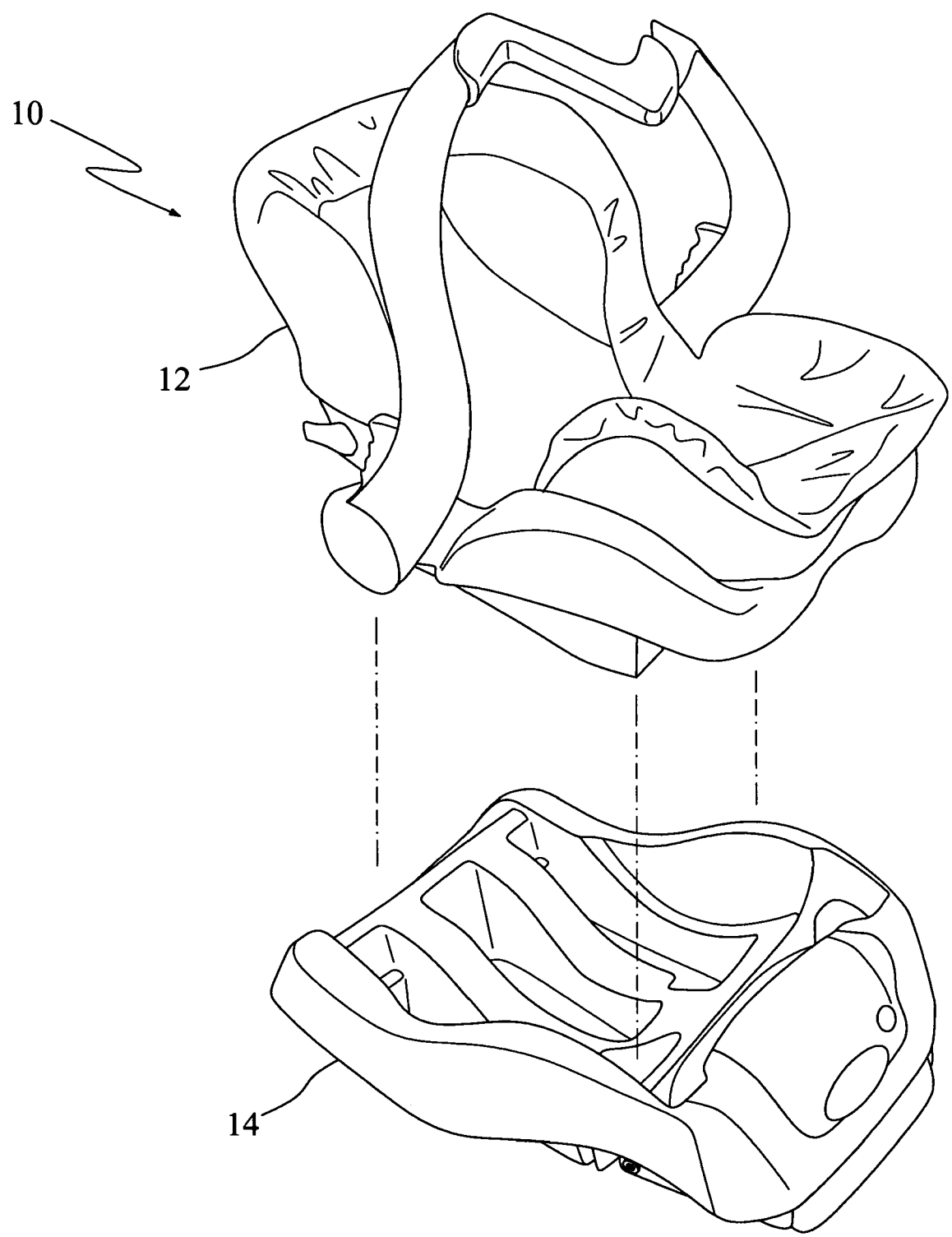
FIG. 1 shows a perspective view of the infant car seat and adjustable base platform according to an embodiment of the present invention.

As seen in FIG. 1, the present invention is directed to an infant car seat, and in particular to adjustable base platform for an infant car seat. In an embodiment of the present invention, the car seat 10 comprises a seat member 12 and a base unit 14 that is capable of being removably coupled to the seat member 12. In an alternative embodiment, the seat member and base member can be integrally formed as one unit.

Figure 2:
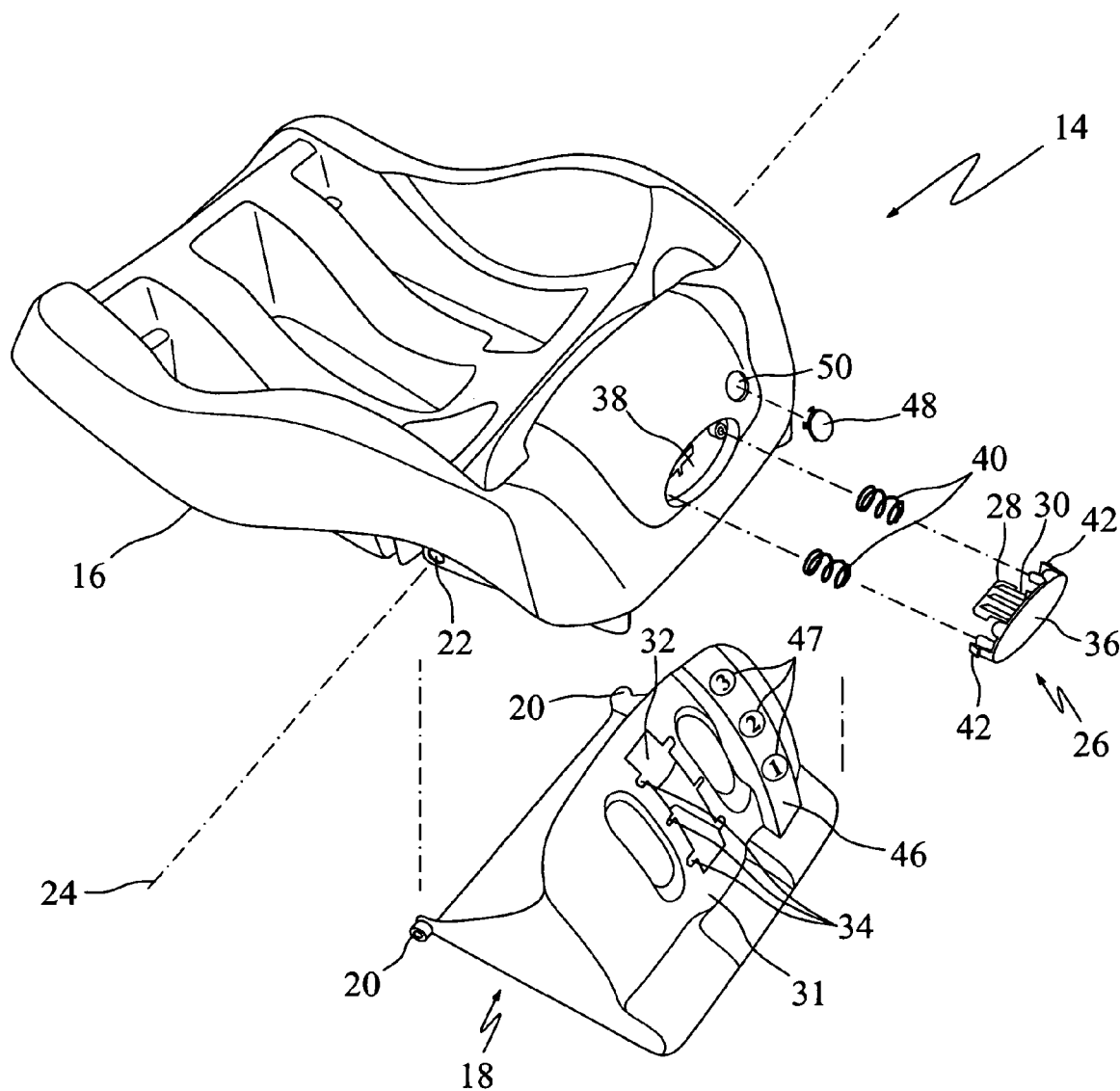
FIG. 2 shows an exploded view of the adjustable base platform according to an embodiment of the present invention.
Figure 3:
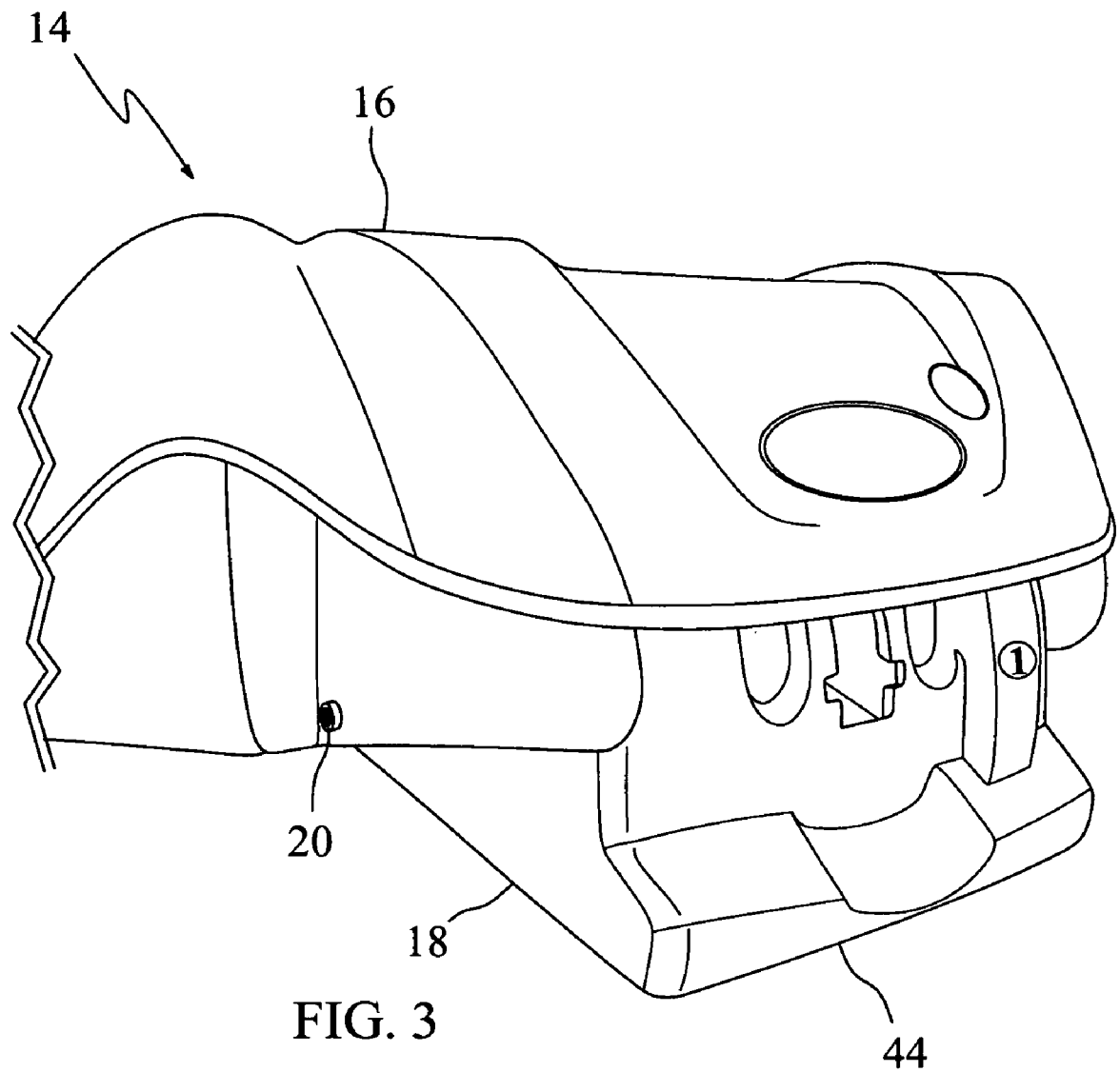
FIG. 3 shows a close-up view of the wedge member interfaced with the frame member of the adjustable base platform according to an embodiment of the present invention.

FIG. 2 shows an exploded view of the base unit 14, which includes a frame member 16 and a wedge member 18. The wedge member 18 contains a pin 20 on either end of its narrow end, and each of these pins 20 fits into a recess 22 on the frame member 16, as shown more closely in FIG. 3, securing the wedge member to the frame member. The pins 20 allow the wedge member 18 to rotate about an axis 24 defined by the pins 20.

FIG. 2 also shows a locking member 26 that can lock the wedge member 18 into place, preventing rotation about the axis 24. The locking member 26 has a wide portion 28 and a narrow portion 30. These portions of the locking member 26 fit into a slot 32 in the lateral surface 31 of the wedge member 18 and can engage a series of pairs of notches 34 on the sides of the slot 32. In the embodiment shown in FIG. 2, the slot 32 has three pairs of notches 34 along its sides, each pair of notches 34 consisting of two notches directly opposite each other on the sides of the slot 32.

Figure 4:
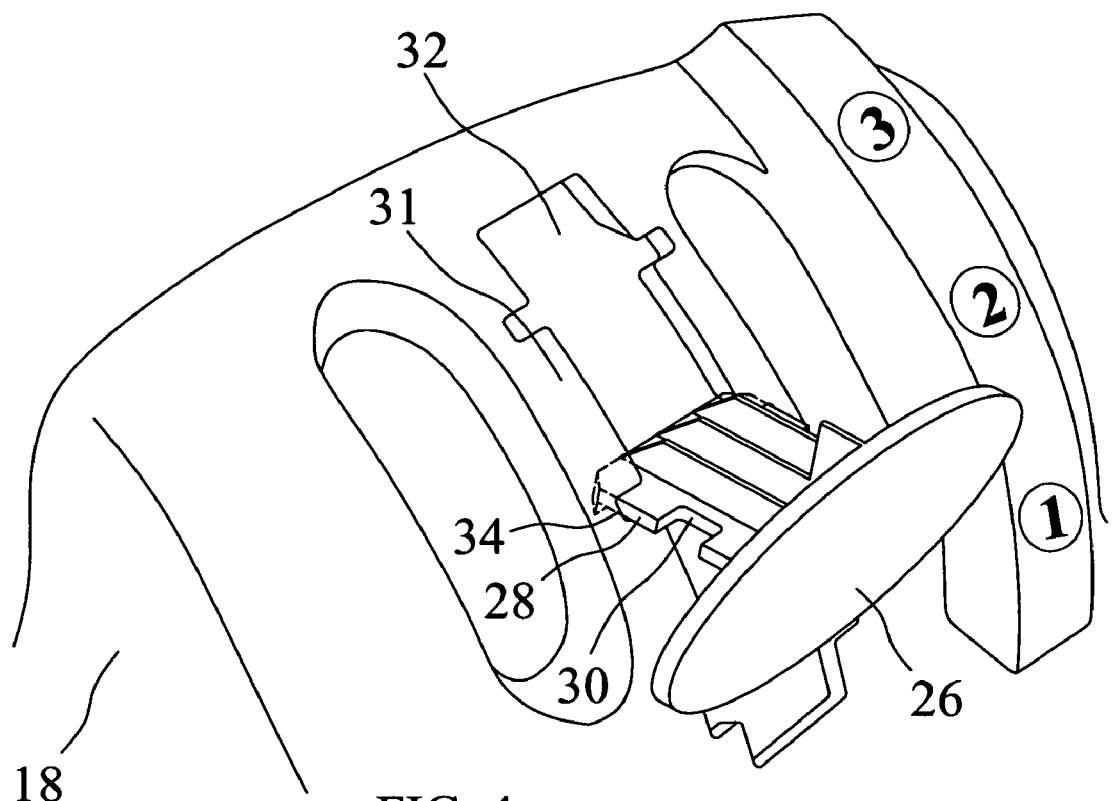
FIGS. 4 and 5 show the interaction of the locking member with the slot and notches on the lateral surface of the wedge member of the adjustable base platform according to an embodiment of the present invention.
Figure 5:
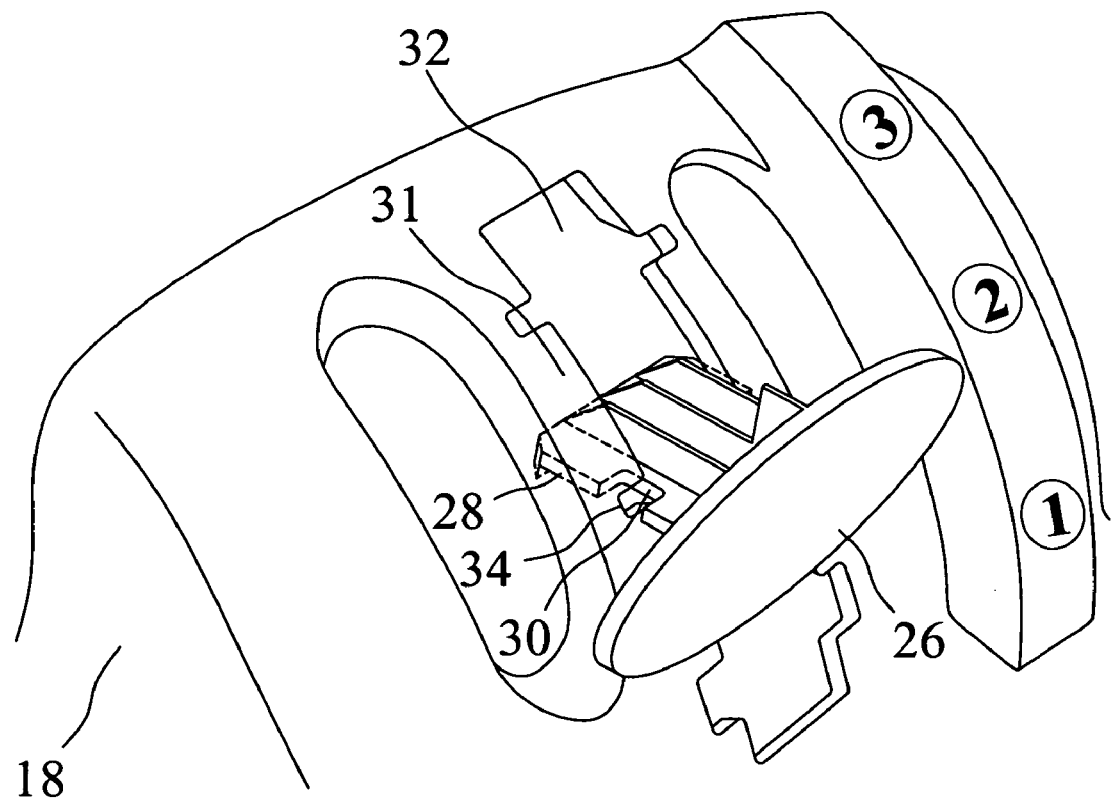

FIGS. 4 and 5 show close-up views of the locking member 26 interacting with the slot 32 and notches 34 on the wedge member 18. In FIG. 4, the wide portion 28 of the locking member 26 is engaged with a pair of notches 34. The wide portion 28 has approximately the same width as the distance across the pair of notches 34, and the wide portion 28 thus locks the wedge member 18 in place, preventing the wedge member from rotating. In FIG. 5, the wide portion 28 of the locking member 26 is not engaged with a pair of notches 34. The wide portion 28 has been moved inside the lateral surface 31 of the wedge member 18, and the narrow portion 30 of the locking member 26 now occupies the space inside the slot 32 between the pairs of notches 34. Because the narrow portion has a width that is no wider than the slot 32, the locking member 26 cannot engage the notches 34 in this position. Accordingly, when the locking member 26 is positioned as shown in FIG. 5, the wedge member 18 is free to rotate about the axis 24.

Referring again to FIG. 2, the locking member 26 can include a push button surface 36 that is seated in an opening 38 in the frame member 16. Springs 40 can be used to restore the locking member 26 to its original position after the user has depressed the locking member, and retainer hooks 42 hold the locking member 26 in place within the opening 38 in the frame member 16.

In this embodiment, the normal or "original" position for the locking member is that depicted in, and described above with reference to, FIG. 4, where the wide portion 28 of the locking member 26 is engaged with one of the pairs of notches 34 in the wedge member 18. In this condition, the wedge member 18 is fixed with respect to the frame member 16 and cannot rotate about the axis 24. If the user depresses the push button surface 36 of the locking member 26, the locking member 26 will be moved to the position depicted in, and described above with reference to, FIG. 5, where the wide portion 28 of the locking member 26 is not engaged with one of the pairs of notches 34 in the wedge member 18. In this condition, the wedge member 18 is free to rotate about the axis 24. When the wedge member 18 has rotated to the desired position, the user can release the locking member 26, and the springs 40 will restore the locking member to the "original" position, provided that a pair of notches 34 in the lateral surface 31 of the wedge member 18 is aligned with the locking member 26. If a pair of notches 34 is not aligned with the locking member 26, the wedge member 26 can be rotated slightly until a pair of notches 34 becomes aligned with the locking member 26, at which point the locking member 26 will snap back into its "original" position, locking the wedge member 18 in this position. These discrete positions into which the wedge member can be locked in this manner will be determined by the number and spacing of the pairs of notches 34 on the wedge member 18, and these possible discrete positions for the wedge member can be referred to as the "discrete positions."

Figure 6:
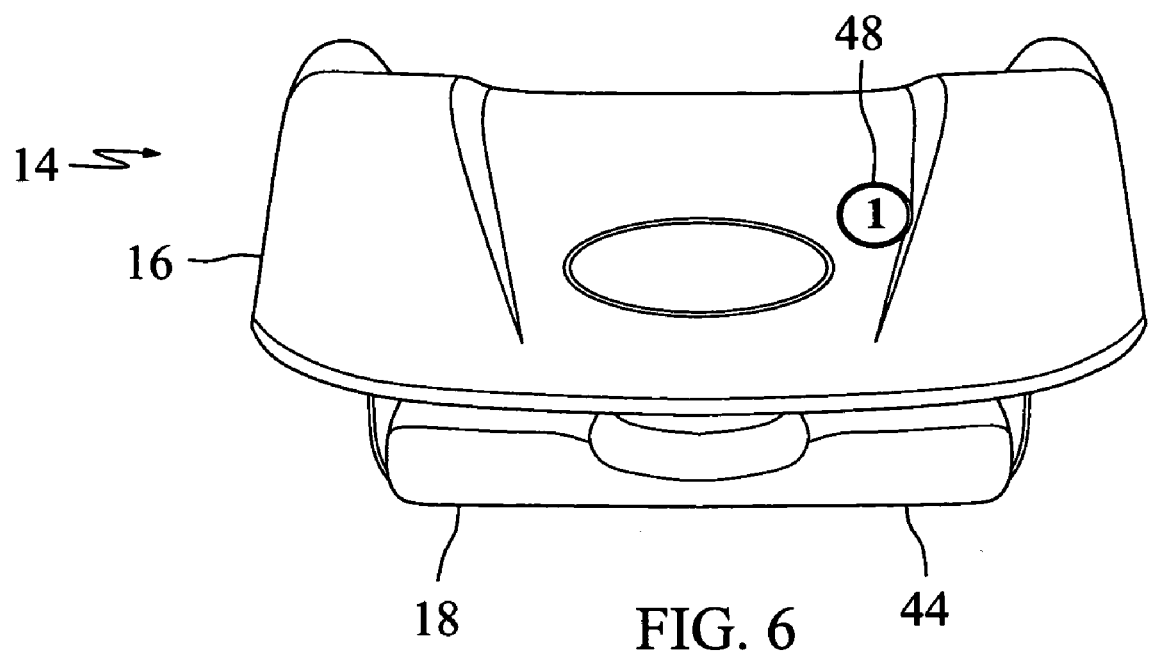
FIGS. 6 and 7 show different positions of the wedge member that can achieve different degrees of tilt of the adjustable base platform and infant car seat according to an embodiment of the present invention.
Figure 7:
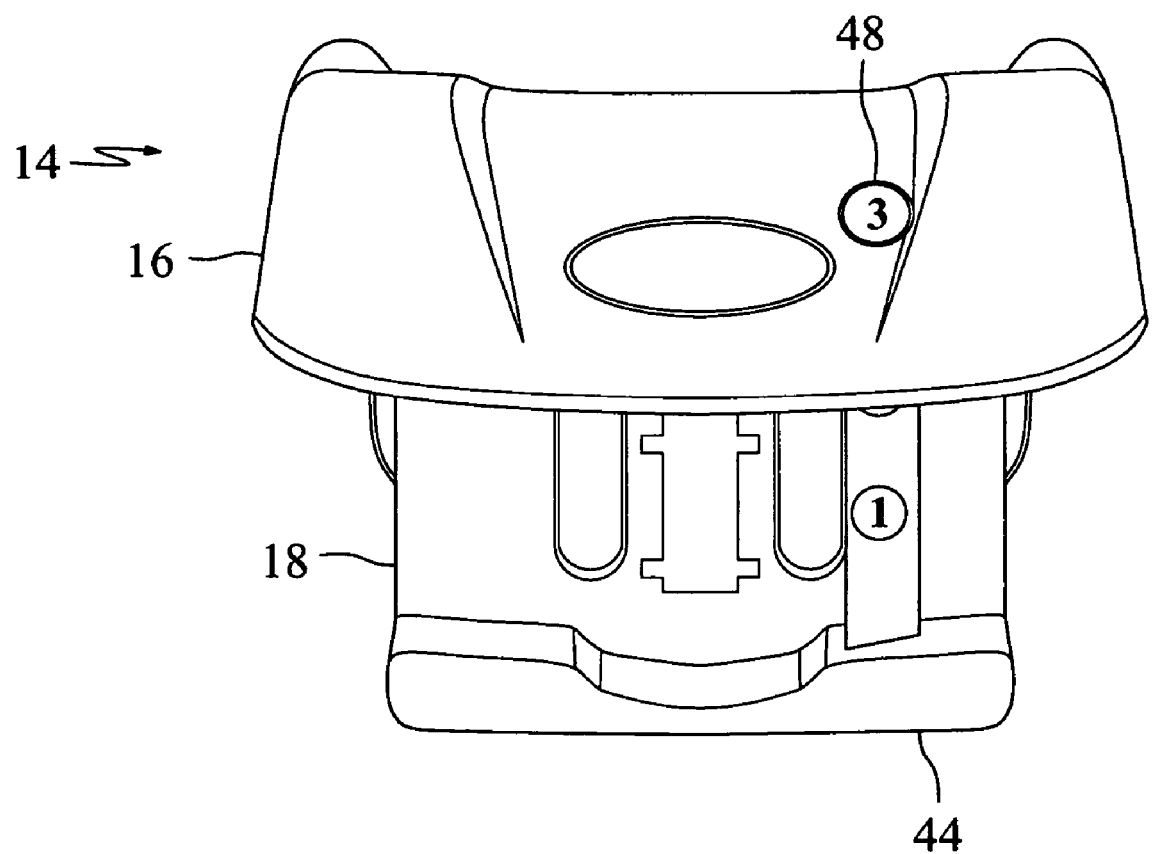

In this manner, the user can adjust the tilt angle of the base unit 14 and seat member 12. FIGS. 6 and 7 illustrate how different positions of the wedge member 18 produce different angles of tilt for the base unit 14. In the position shown in FIG. 6, the wedge member 18 is completely retracted into the frame member 16, and the front edge 44 of the wedge member 18 is approximately located in the plane of the bottom of the frame member 16. In this configuration, the base unit 14 sits flat, with little or no tilt. In the position shown in FIG. 7 and FIG. 3, the wedge member 18 has been rotated so that its front edge 44 is below the plane of the bottom of the frame member 16. In this configuration, the base unit 14 (and the car seat 12 attached to it) is tilted back relative to the position achieved by the configuration shown in FIG. 6. The tilt positions that can be achieved for the adjustable base unit or car seat in this manner will be discrete positions, determined by the number and spacing of the pairs of notches 34 on the wedge member 18, as explained above.

The embodiment of the present invention includes an indicator for displaying a visual indication of the tilt position. Referring again to FIG. 2, the wedge member 18 includes a curved lateral surface 46 to which visible markings 47 can be affixed. This curved lateral surface 46 lines up below a window 48 that fits into an opening 50 in the frame member 16. Thus, a small portion of the curved lateral surface 46 is visible through the window 48 at any given position of the wedge member 18. As the wedge member 18 is rotated, a different portion of the curved lateral surface 46 becomes visible through the window 48. In an embodiment, the curved lateral surface 46 contains a plurality of markings, any one of which can be seen through the window 48 depending on the position of the wedge member 18 with respect to the frame member 16. For each possible angle of tilt that can be produced by rotating the wedge member 18 relative to the frame member 16 until the locking member 26 restores to its original position, as described above, a different marking will be visible through the window 48. Thus, the marking that is visible through the window 18 indicates to the user the degree of tilt of the base unit 14 or infant car seat 10.

In the embodiment shown in the drawings, the visible markings 47 include the numerals "1", "2", and "3". One of these numerals can be visible through the window 48 when the wedge member 18 is locked into one of the discrete positions, as described above. In the configuration shown in FIG. 6, where the wedge member 18 is completely retracted into the frame member 16 and the base unit 14 sits flat with little or no tilt, the numeral "1" is visible through the window 48. In the configuration shown in FIG. 7, where the wedge member 18 has been rotated so that its front edge 44 is below the plane of the bottom of the frame member 16 and the base unit 14 (and the car seat 12 attached to it) is tilted back, the numeral "3" is visible through the window 48. Other configurations, achievable by positioning the wedge member in other discrete positions, can result in other numerals being visible through the window 48, in various embodiments of the present invention.

Having described the invention with reference to embodiments, it is to be understood that the invention is defined by the claims and it not intended that any limitations or elements describing the embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the

What is claimed is:

1. An adjustable base platform for an infant car seat comprising:
   a frame member;
   a wedge member affixed to the frame member along an axis parallel to one edge of the frame and wedge members, the wedge member being capable of rotating about the axis;
   a locking member capable of being positioned to prevent rotation of the wedge member about the axis;
   an indicator for displaying a visual indication of the wedge's rotational position; and
   at least one spring located between the frame member and the locking member, the spring being capable of restoring the locking member to its original position after being depressed by the user;
   wherein the wedge member includes a plurality of pairs of notches for engaging the locking member;
   wherein the locking member includes a wide portion and a narrow portion, the wide portion capable of engaging any one of the plurality of pairs of notches on the wedge member to prevent rotation of the wedge member about the axis;
   wherein the locking member includes a surface capable of being depressed by a user;
   wherein the locking member is originally positioned such that its wide portion is engaged with one of the plurality of pairs of notches on the wedge member to prevent rotation of the wedge member about the axis;
   wherein upon depression of the locking member by the user, the locking member becomes positioned such that its wide portion is not engaged with any one of the plurality of pairs of notches on the wedge member, whereby the wedge member can rotate about the axis;
   wherein the indicator comprises a curved lateral surface formed on the wedge member, and visible markings on the curved lateral surface;
   wherein the indicator further comprises a transparent window affixed to the frame member, the transparent window capable of revealing a portion of the visible markings on the curved lateral surface;
   wherein the visible markings comprise numerals;
   wherein the indicator further comprises a transparent window affixed to the frame member;
   wherein a unique numeral is visible through the transparent window corresponding to the rotational position of the wedge member;
   wherein the indicator further comprises a transparent window affixed to the frame member; and
   wherein a unique numeral is visible through the transparent window corresponding to the angle of tilt in which the adjustable base platform is configured.

2. An infant car seat comprising:
   a seat member;
   a base member capable of being removably coupled to the seat member, wherein the base member includes a frame member; a wedge member affixed to the frame member along an axis parallel to one edge of the frame and wedge members, the wedge member being capable of rotating about the axis;
   a locking member capable of being positioned to prevent rotation of the wedge member about the axis;
   an indicator for displaying a visual indication of the wedge's rotational position; wherein the wedge member includes a plurality of pairs of notches for engaging the locking member; and
   at least one spring located between the frame member and the locking member, the spring being capable of restoring the locking member to its original position after being depressed by the user; wherein the locking member includes a wide portion and a narrow portion, the wide portion capable of engaging any one of the plurality of pairs of notches on the wedge member to prevent rotation of the wedge member about the axis;
   wherein the locking member includes a surface capable of being depressed by a user;
   wherein the locking member is normally positioned such that its wide portion is engaged with one of the plurality of pairs of notches on the wedge member to prevent rotation of the wedge member about the axis;
   wherein upon depression of the locking member by the user, the locking member becomes positioned such that its wide portion is not engaged with any one of the plurality of pairs of notches on the wedge member, whereby the wedge member can rotate about the axis;
   wherein the indicator comprises a curved lateral surface formed on the wedge member, and visible markings on the curved lateral surface;
   wherein the indicator further comprises a transparent window affixed to the frame member, the transparent window capable of revealing a portion of the visible markings on the curved lateral surface;
   wherein the visible markings comprise numerals;
   wherein the indicator further comprises a transparent window affixed to the frame member;
   wherein a unique numeral is visible through the transparent window corresponding to the rotational position of the wedge member;
   wherein the indicator further comprises a transparent window affixed to the frame member; and
   wherein a unique numeral is visible through the transparent window corresponding to the angle of tilt in which the infant car seat is configured.

3. An adjustable base platform for an infant car seat comprising:
   a frame member;
   a base member affixed to the frame member in at least one attachment point and capable of rotating about the attachment point;
   a locking member capable of being positioned to prevent rotation of the base member about the attachment point;
   an indicator for displaying a visual indication of the base member's rotational position; and
   at least one spring located between the frame member and the locking member, the spring being capable of restoring the locking member to its original position after being depressed by the user;
   wherein the base member includes a plurality of notches for engaging the locking member;
   wherein the locking member includes a wide portion and a narrow portion, the wide portion capable of engaging any one of the plurality of notches on the base member to prevent rotation of the base member about the attachment point;
   wherein the locking member includes a surface capable of being depressed by a user;
   wherein the locking member is originally positioned such that its wide portion is engaged with one of the plurality of notches on the base member to prevent rotation of the base member about the attachment point; and wherein upon depression of the locking member by the user, the locking member becomes positioned such that its wide portion is not engaged with any one of the plurality of notches on the base member, whereby the base member can rotate about the attachment point.

4. An adjustable base platform for an infant car seat, comprising:

a frame member;

a base member affixed capable of sliding vertically with respect to the frame member;

a locking member capable of being positioned to prevent the base member from sliding vertically with respect to the frame member;

an indicator for displaying a visual indication of the base member's position relative to the flame member; and at least one spring located between the frame member and the locking member, the spring being capable of restoring the locking member to its original position after being depressed by the user, wherein the base member includes a plurality of notches for engaging the locking member;

wherein the locking member includes a wide portion and a narrow portion, the wide portion capable of engaging any one of the plurality of notches on the base member to prevent the base member from sliding vertically with respect to the frame member;

wherein the locking member includes a surface capable of being depressed by a user;

wherein the locking member is originally positioned such that its wide portion is engaged with one of the plurality of notches on the base member to prevent the base member from sliding vertically with respect to the frame member; and wherein upon depression of the locking member by the user, the locking member becomes positioned such that its wide portion is not engaged with any one of the plurality of notches on the base member, whereby the base member can slide vertically with respect to the frame member.

\* \* \* \* \*